United States Patent Office 3,778,415
Patented Dec. 11, 1973

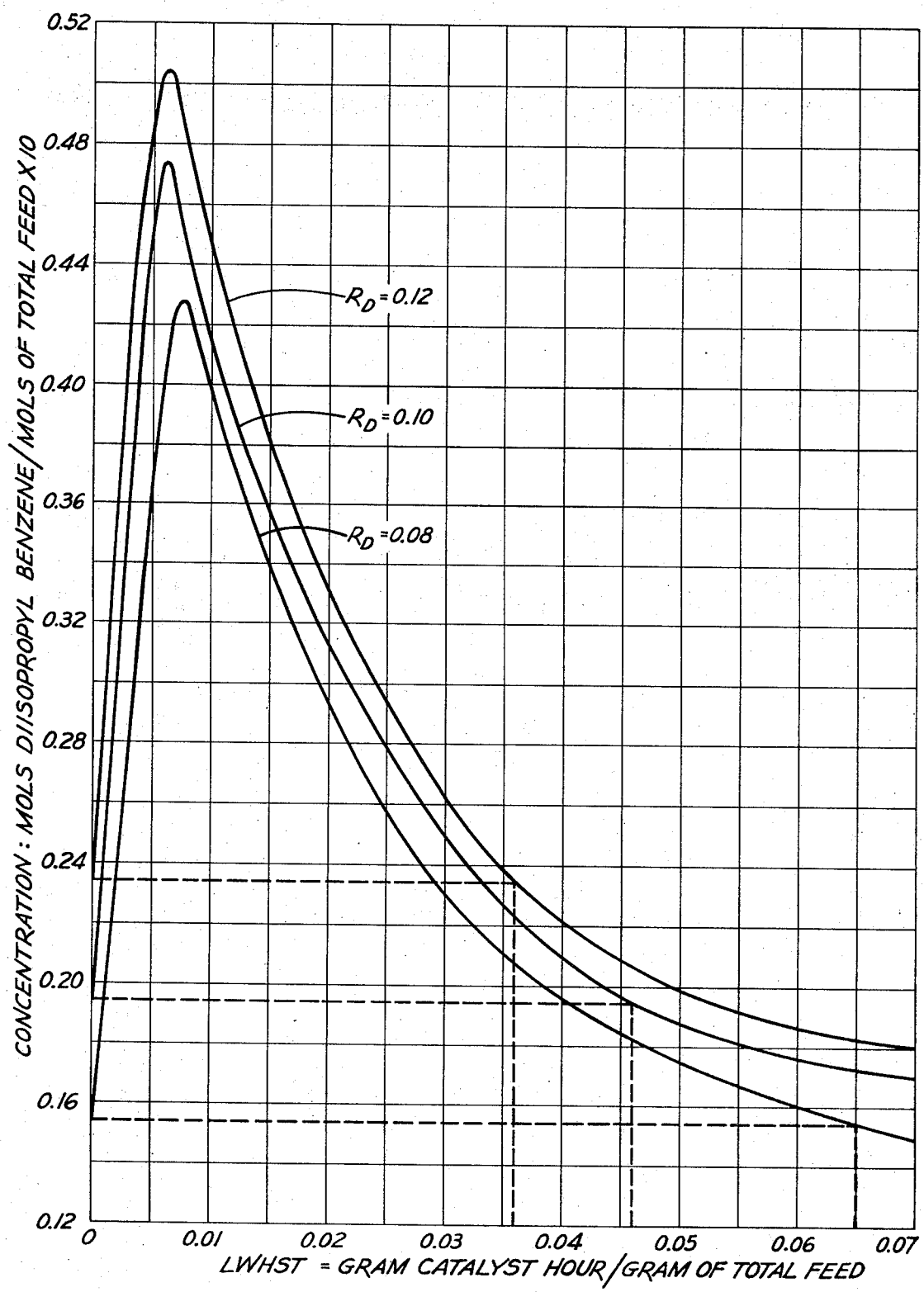
Fig. I

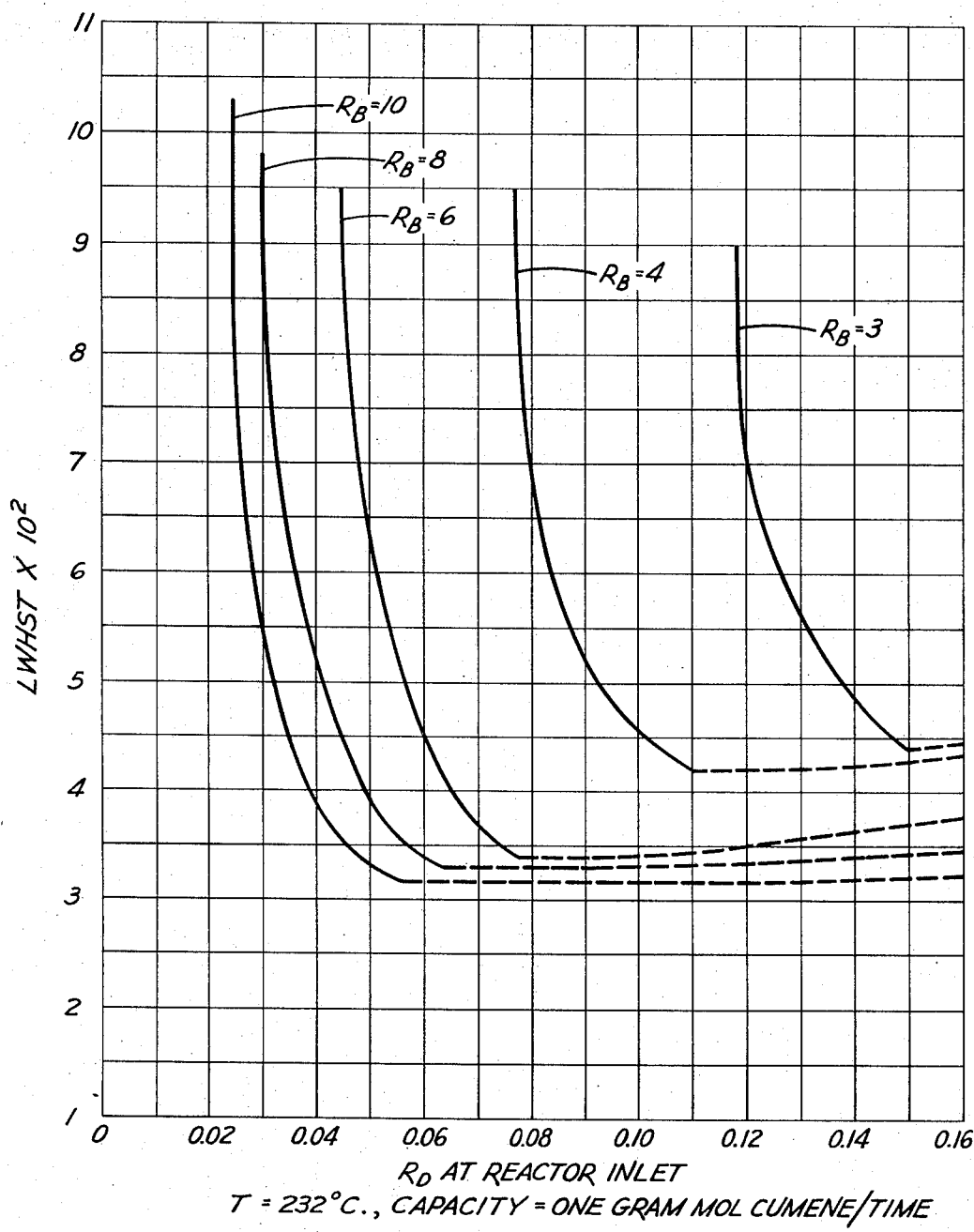
Fig. II

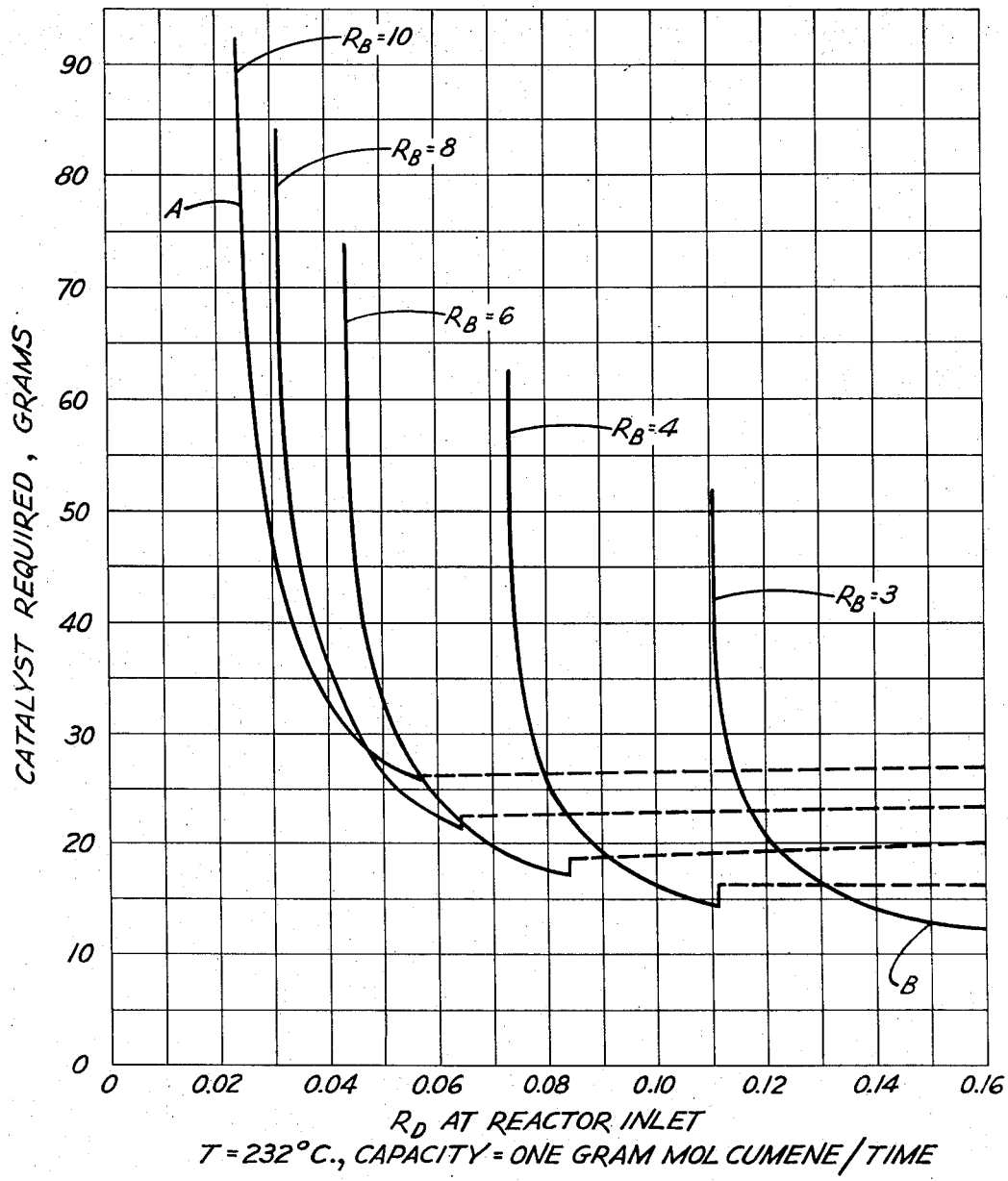
Fig. III

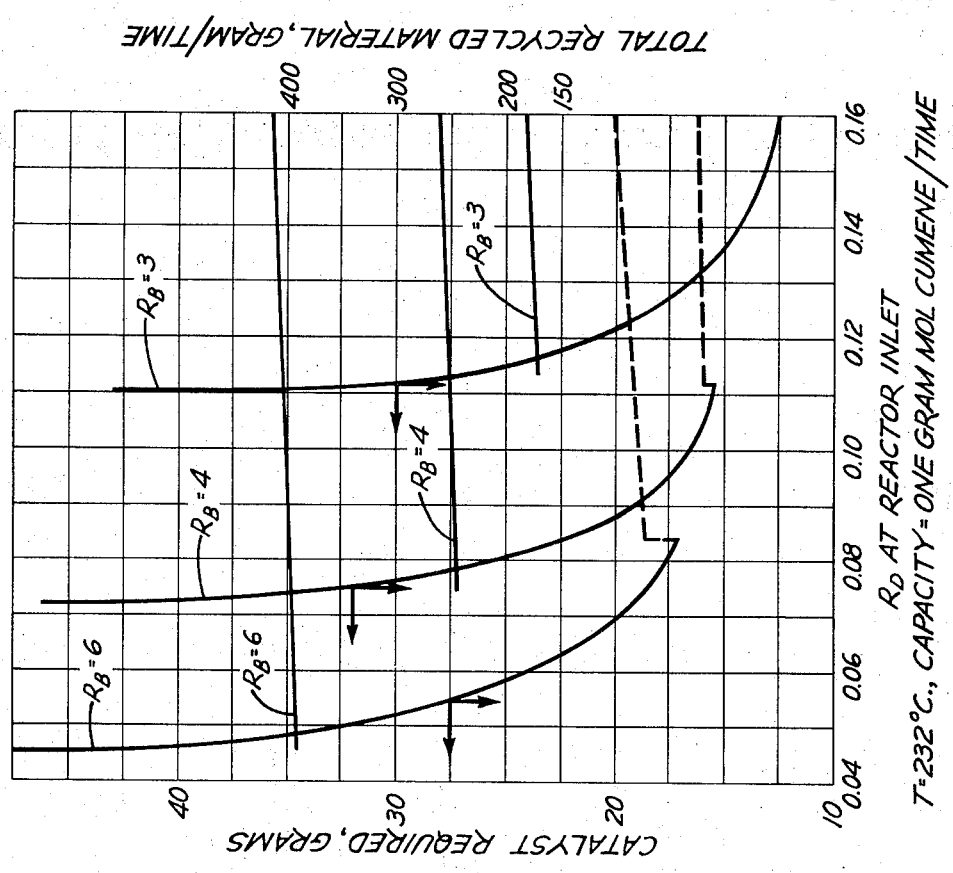
Fig. V
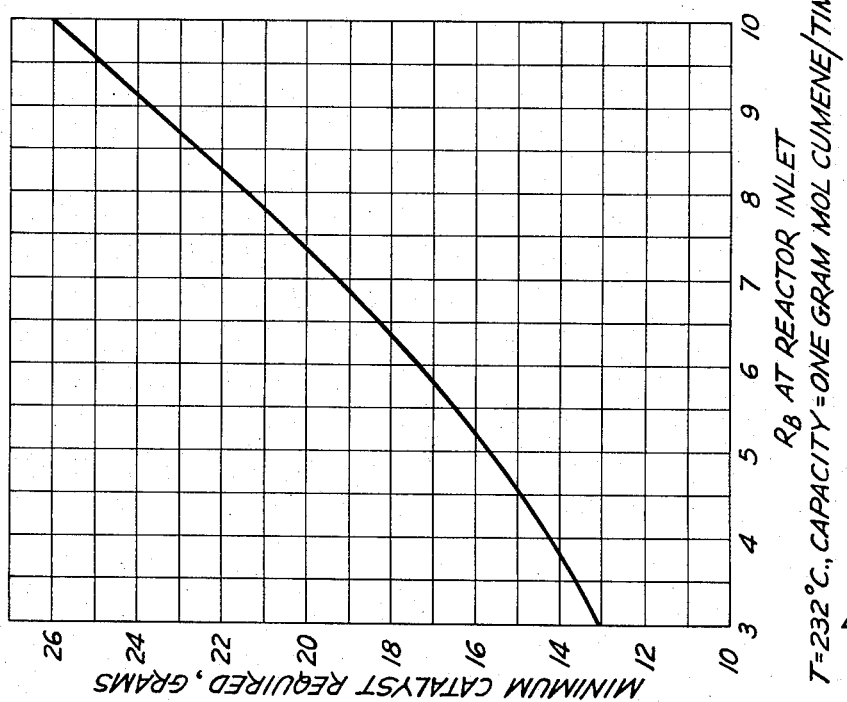
Fig. IV
INVENTOR.
DANIEL Y.C. KO

3,778,415
PROCESS FOR PREPARING A MONOALKYL AROMATIC
Daniel Y. C. Ko, Pittsburgh, Pa., assignor to Gulf Research & Development Company, Pittsburgh, Pa.
Filed Aug. 13, 1971, Ser. No. 171,541
Int. Cl. C07c *3/62*
U.S. Cl. 260—672 T    10 Claims

ABSTRACT OF THE DISCLOSURE

An improvement in a process wherein a first compound and a second compound react with each other to produce a third compound and a fourth compound in essentially irreversible reactions and the second and fourth compounds react with each other to produce the third compound in equilibrium-limited reactions, the second compound being present in the reaction mixture in excess of that required for the reactions, and the excess amount of the second compound is recycled to the reaction zone, which involves reducing the amount of the second compound in the reaction mixture, introducing therein the fourth compound in an amount greater than would be present at equilibrium and terminating the process before the reaction mixture reaches equilibrium.

---

This invention relates to a process wherein there occurs essentially irreversible and equilibrium-limited reactions, illustrated, for example, by the following general reaction mechanisms:

$$F+G \rightarrow H,$$
$$F+G \rightarrow I \text{ and}$$
$$I+G \rightleftharpoons H,$$

wherein each of F, G, H and I are chemical compounds. In the above reactions, for example, a reaction mixture containing Compounds F and G are reacted with each other, batch or continuous operation, with or without catalyst, in essentially irreversible reactions to produce desired Compound H and undesired Compound I, wherein the amount of said Compound G initially present is in excess of that amount required for the reactions therein. In addition, said Compound G reacts with said undesired Compound I in essentially equilibrium-limited reactions to produce said desired Compound H. During the course of the reactions the concentration of said Compound I reaches an amount in excess of that amount present at equilibrium before the reaction mixture reaches equilibrium.

In accordance with the process defined and claimed herein, I have found that the total amount of recycle and the size of the reactor can be substantially reduced by reducing the amount of said Compound G in the reaction mixture, introducing therein Compound I in an amount greater than would be present at equilibrium and terminating the process before the reaction product reaches equilibrium. In a preferred embodiment, the process is terminated when the amount of said undesired Compound I in the reaction product corresponds substantially in amount to the amount of said Compound I in the initial reaction mixture. By recycling the total amount of said Compound I in the reaction product, there is virtually no net production of the same. At the same time conversions of Compound F and selectively to desired Compound H is maintained.

The process of this invention can further be illustrated by the following. Benzene and propylene were passed over a zeolite catalyst, resulting in the production of cumene and diisopropyl benzene. A zeolite catalyst can be defined as a natural or synthetic hydrated metal alumino-silicate consisting basically of an open, three-dimentioned framework of $SiO_4$ and $AlO_4$ tetrahedra, having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc., and/or ammonium or hydrogen. A particularly effective zeolite is zeolite Y such as defined in U.S. Patent No. 3,130,007. An example of zeolite Y will fall within the following chemical composition:

$$Na^+{}_{56+y}[(AlO_2)_{56+y}(SiO_2)_{136-y}]$$

wherein y generally has a value of 0, but can vary from −8 to +20. In the specific reaction herein a Y zeolite molecular sieve of the following unit cell formula was used:

$$(La^{+++})_{8.8}(NH^+{}_4)_{21.1}(Na^+)_{8.3}[AlO_2)_{55.7}(SiO_2)_{136.3}] \cdot ZH_2O$$

which had been previously heated to a temperature of about 550° C. for about one hour, with, presumably, the loss of $NH_3$ and $H_2O$ therefrom. A one-half inch inner diameter, 52-inch long stainless steel reactor, equipped with a three-inch by 50-inch outer jacket filled with dixylylethane as a heat transfer medium was used. Heat was supplied with a calrod electrical heater and was controlled by a thermoelectric controller. A thermowell extended coaxially through the reactor. The temperature in the reactor was measured by thermocouples evenly spaced through the preheat section, catalyst bed and support section. The pressure was controlled by means of a pressure control valve in the effluent line. Feed to the reactor was pumped upflow by an adjustable stroke proportioning pump from a calibrated feed tank. The reactor was filled with a preheat section of glass beads to a depth of 14 inches. The catalyst section, 13 inches in depth, was composed of 10 grams of the specific 10 to 20 mesh Y type zeolitic molecular sieve catalyst defined immediately hereinabove with two volumes of 8 to 10 mesh quartz per volume of the catalyst. The remaining reactor length was filled with glass beads. The effluent from the reactor was cooled and collected in a gas-liquid separator. The off-gas was measured by a wet test meter, while the liquid product was recovered and weighed. The results obtained are tabulated below in Table I.

TABLE I

| Run number | 1 | 2 | 3 | 4 | 5 | 6 | 7 | 8 | 9 | 10 | 11 |
|---|---|---|---|---|---|---|---|---|---|---|---|
| Pressure, pounds per square inch gauge | 500 | 500 | 500 | 500 | 500 | 500 | 500 | 500 | 500 | 500 | 500 |
| Temperature, °C | 232 | 232 | 232 | 214 | 214 | 214 | 214 | 232 | 232 | 232 | 232 |
| Benzene to propylene molar ratio | 9.96 | 9.96 | 9.96 | 9.96 | 9.96 | 9.96 | 9.96 | 5.905 | 5.905 | 5.905 | 5.905 |
| LWHST [1] | 0.0127 | 0.0498 | 0.1054 | 0.0129 | 0.02525 | 0.0506 | 0.0833 | 0.01262 | 0.0267 | 0.0515 | 0.1 |
| Reactants (mols per 100 grams): [2] | | | | | | | | | | | |
| Benzene | 1.215 | 1.215 | 1.215 | 1.215 | 1.215 | 1.215 | 1.215 | 1.1733 | 1.1733 | 1.1733 | 1.1733 |
| Propylene | 0.122 | 0.122 | 0.122 | 0.122 | 0.122 | 0.122 | 0.122 | 0.1986 | 0.1986 | 0.1986 | 0.1986 |
| Product (mols per 100 grams): | | | | | | | | | | | |
| Benzene | 1.1027 | 1.10 | 1.09 | 1.109 | 1.1065 | 1.1036 | 1.1023 | 1.066 | 0.9956 | 0.9881 | 0.9810 |
| Cumene | 0.1038 | 0.111 | 0.1128 | 0.0999 | 0.1066 | 0.1075 | 0.1107 | 0.1426 | 0.1655 | 0.1770 | 0.1785 |
| Diisopropylbenzene | 0.00813 | 0.00356 | 0.00273 | 0.01133 | 0.00849 | 0.00485 | 0.0310 | 0.02409 | 0.01223 | 0.00810 | 0.007 |
| Propylene | 0.0 | 0.0 | 0.0 | 0.0 | 0.0 | 0.0 | 0.0 | 0.0 | 0.0 | 0.0 | 0.0 |

[1] Liquid weight hourly space time = Gram catalyst hour/grams of total fluid.
[2] Mols/100 grams of total fluid with total fluid including total reaction mixture.

Based on the above data the following reaction mechanism and kinetics were proposed:

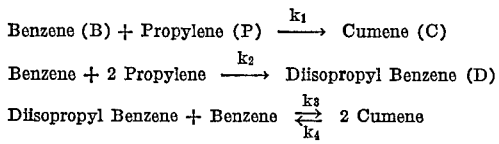

$r_1 = k_1 C_B C_P$, $r_2 = k_2 C_B C_P^2$, $r_3 = k_3 C_D C_B$, and $r_4 = k_4 C_C^2$, wherein $k_1$, $k_2$, $k_3$ and $k_4$ are reaction rate constants, $r_1$, $r_2$, $r_3$ and $r_4$ are reaction rates (gram mols per hour per gram of catalyst) and $C_B$, $C_P$, $C_C$ and $C_D$ are concentrations (gram mols per gram of total fluid). The reaction mechanism and kinetics were mechanized on an analog computer. Simulation studies were then conducted to determine the rate constant and the associated activation energies so that the kinetic model represented the experimental data. Using the model so obtained simulated reactions were carried out on the computer wherein benzene was reacted with propylene to obtain cumene and diisopropyl benzene, using a benzene to propylene molar ratio of 4:1 and a temperature of 232° C. Concentration profiles for diisopropyl benzene for these runs are shown in FIG. I wherein the concentration of diisopropyl benzene in mols per 10 mols of total fluid is plotted against liquid weight hourly space time. In FIG. I, $R_D$ refers to the molar ratio of diisopropyl benzene to propylene in the initial reaction mixture. It can be seen how a small increase in diisopropyl benzene in the initial reaction mixture results in a significant saving in space time required. Space times of 0.065, 0.046 and 0.036 are needed for the cases of $R_D = 0.08$, 0.10 and 0.12, respectively, to achieve 100 percent selectivity. In this case, a 47 percent reduction in space time is made possible by a small increase in diisopropyl benzene which results in only a 0.6 percent increase in total amount of material introduced into the reaction zone.

FIG. II shows the plot of the required space time to achieve 100 percent selectivity versus $R_D$, with molar ratio of benzene to propylene ($R_B$) as a parameter. Since a minimum $R_D$ exists for each $R_B$, any operation with less than a minimum $R_D$ cannot achieve 100 percent selectivity. The minimum $R_D$ increases as $R_B$ decreases. The curves are asymptotic to the vertical lines crossing the minimum $R_D$'s. The space time required decreased sharply as $R_D$ was increased from the minimum $R_D$. The decrease becomes less significant as $R_D$ is further away from the minimum $R_D$. This decreasing trend will continue until a point is reached beyond which complete conversion of propylene is no longer possible at the space time where 100 percent selectivity is achieved. Since complete conversion of propylene is a prerequisite herein, the basis of the curves shown in FIG. II is thus changed from 100 percent selectivity to 100 percent conversion of propylene. The latter parts of the curves are indicated by the dotted lines. Note that the dotted lines increase slightly as $R_D$ increases for each $R_B$. Thus, the minimum space time required for each $R_B$ is obtained at the point where both 100 percent selectivity and 100 percent conversion of propylene are achieved at the same time.

It should be noted that at the same $R_D$, the space time required decreases with increasing $R_B$. This is due to the fact that with the same $R_D$, the reactor conditions required to obtain 100 percent selectivity are further away from the inefficient equilibrium region (minimum $R_D$ region) at the higher $R_B$ than at the lower $R_B$ ratios.

Generally, space time required is a measure of the activity of the catalyst and of the efficiency of the operation. However, a more important variable is the amount of catalyst needed, since catalyst is more directly related to the cost of a chemical operation. FIG. III shows the plot of the amount of catalyst required to achieve 100 percent selectivity versus $R_D$ for several values of $R_B$. Again it is seen that there is a minimum $R_D$ for each $R_B$ so that 100 percent selectivity is attainable only if $R_D$ is greater than the minimum $R_D$. If $R_D$ is close to minimum, then the amount of catalyst needed is very large. By slightly increasing $R_D$, tremendous saving of catalyst is achieved. The general trend of the catalyst required is the same as that of the space time required shown in FIG. II. At each value of $R_B$ the catalyst amount decreases with increasing $R_D$ until a point is reached beyond which complete conversion of propylene is not obtained at the space time where 100 percent selectivity is achieved. The dotted lines, where 100 percent selectivity is also obtained, indicate the amount of catalyst required to completely convert propylene. As noted, the dotted lines rise very slightly as $R_D$ increases, since such a small increase of diisopropyl benzene can only have minimal effects on the alkylation activity. However, there is a significant difference between the space time needed and the catalyst required. At the same $R_D$, the amount of catalyst at higher $R_B$ is not necessarily smaller than for for lower $R_B$. Examination of FIG. III reveals that there is a minimum amount of catalyst needed to achieve 100 percent selectivity for each $R_B$. In fact, an envelope in FIG. III defines the unique combination of $R_B$ and $R_D$ so that 100 percent selectivity can be obtained with the least amount of catalyst. The functional relationship between the least amount of catalyst and $R_B$ is plotted on FIG. IV. It is seen that the least amount of catalyst required decreases with $R_B$. For the most efficient operation, at least twice as much catalyst is required for a benzene/propylene molar ratio of 10:1 as is required at 3:1. This is totally unexpected and unique because it is directly contrary to the design and operating principles of conventional cumene processes.

Separation and pumping costs (investment and operating costs) are directly related to the total recycle flow rate. FIG. V shows the total recycle flow rate versus $R_D$ for three values of $R_B$. The amount of catalyst is also plotted for reference. At each value of $R_B$, total recycle flow rate increases with increasing $R_D$. However, the increase is very small because the increased amount of diisopropyl benzene constitutes a very small percentage of the total recycle flow. A much more noticeable reduction in total recycle flow can be made by reducing $R_B$. The important indication in FIG. V, however, is that the objective can be realized by reducing both the amount of catalyst and the total recycle flow rate.

Finally, as an example to show the significance of the unusual discovery made herein, a comparison is made for points A and B in FIG. III where 100 percent selectivity to cumene is obtained. Point A represents the condition of $R_B = 10$, $R_D = 0.25$, liquid weight hour space time (LWHST) = 0.094, 78 grams of catalyst and total recycle flow rate of 826 grams per unit time (total diisopropyl benzene and benzene in excess of that needed for reaction of benzene with propylene), while point B conditions are $R_B = 3$, $R_D = 0.15$, LWHST = 0.044, 13 grams of catalyst and total recycle flow rate of 170 grams per unit time. Thus, at point B the catalyst requirement is only ⅙ of that needed at point A. The plant size of point B, as measured by flow rate, as above defined, is reduced to about ⅕ of that needed at point A. Thus, contrary to the conventional cumene process, we can reduce the benzene-to-propylene ratio and increase the space velocity while introducing the appropriate amount of diisopropyl benzene so that 100 percent selectivity to cumene is achieved most efficiently.

As an illustration of the operation of the process defined and claimed herein, benzene is generally reacted with propylene in a molar ratio of about 2:1 to about 15:1, preferably about 5:1 to about 10:1, at a temperature of about 180° to about 260° C., preferably about 200° to about 235° C., and a pressure of about 350 to about 70 pounds per square inch gauge, preferably about 400 to about 550 pounds per square inch gauge, at an LWHST of about 0.03 to about 1.0, preferably about 0.04 to about 0.5 to produce as product cumene and diisopropyl benzene, with the latter, at equilibrium, amounting to about 0.01 to about 0.15 mol percent thereof, preferably from about 0.03 to about 0.08 mol percent, based on the product. In the practice of this invention the unreacted benzene is recycled but the molar ratio of benzene to propylene at the inlet line of the reactor has been reduced to about 1:1 to about 10:1, preferably to about 2:1 to about 6:1. The amount of diisopropyl benzene also introduced therein amounts to about 0.2 to about 10 mol percent, preferably from about 0.5 to about 5.0 mol percent, based on the total mols of incoming feed. The reaction is terminated prior to equilibrium and preferably when the amount of diisopropyl benzene therein is equal to the amount introduced into the reaction mixture. In a preferred embodiment, in order to obtain no net production of diisopropyl benzene, the diisopropyl benzene is recovered from the reaction product and is recycled so that it constitutes the diisopropyl benzene introduced into the reaction mixture.

The improvement herein has been both broadly and specifically described and defined, but it is apparent that the same is applicable to any process wherein there occurs essentially irreversible and equilibrium-limited reactions, as exemplified by the general reaction mechanisms defined above, for example, alkylation reactions, such as the alkylation of benzene with propylene or ethylene to obtain cumene or ethyl benzene, respectively, as desired compounds and diisopropyl benzene or diethyl benzene, respectively, as undesired compounds, or the alkylation of toluene with propylene to obtain cymene as the desired compound and diisopropyl toluene as the undesired compound, dealkylation reactions, such as the reaction of toluene with hydrogen at elevated temperatures to obtain benzene as the desired compound and diphenyl as the undesired compound, etc.

Obviously, many modifications and variations of the invention, as hereinabove set forth, can be made without departing from the spirit and scope thereof, and therefore only such limitations should be imposed as are indicated in the appended claims.

I claim:

1. In a process wherein an olefin and an aromatic hydrocarbon react with each other to produce a monoalkyl aromatic and a dialkyl aromatic in essentially irreversible reactions and said monoalkyl aromatic and dialkyl aromatic react with each other to produce said monoalkyl aromatic in equilibrium-limited reactions, said aromatic hydrocarbon being present in the reaction mixture in excess of that required for the reactions, and the excess amount of said aromatic hydrocarbon is recycled to the reaction zone, during the course of said reactions the concentration of said dialkyl aromatic reaches an amount in excess of that amount present at equilibrium before the reaction mixture reaches equilibrium, the improvement which comprises reducing the amount of said excess aromatic hydrocarbon in the initial reaction mixture, introducing therein said dialkyl aromatic in an amount greater than would be present at equilibrium and terminating the reaction before the reaction mixture reaches equilibrium.

2. The process of claim 1 wherein the amount of dialkyl aromatic in the reaction product upon termination of the reaction corresponds substantially to the amount of said dialkyl aromatic initially added into the reaction zone.

3. The process of claim 2 wherein said dialkyl aromatic in the reaction product is recycled to the reaction zone.

4. The process of claim 1 wherein said olefin is propylene, said aromatic hydrocarbon is benzene, said monoalkyl aromatic is cumene and said dialkyl aromatic is diisopropyl benzene.

5. The process of claim 4 wherein the amount of diisopropyl benzene upon termination of the reaction corresponds substantially to the amount of diisopropyl benzene initially added to the reaction zone.

6. The process of claim 5 wherein the diisopropyl benzene in the reaction product is recycled to the reaction zone.

7. The process of claim 4 wherein the molar ratio of benzene to propylene into the reactor is from about 1:1 to about 10:1 and the amount of diisopropyl benzene introduced amounts to about 0.2 to about 10 mol percent, based on the total mols of incoming feed.

8. The process of claim 4 wherein the molar ratio of benzene to propylene into the reactor is from about 2:1 to about 6:1 and the amount of diisopropyl benzene introduced amounts to about 0.5 to about 5.0 mol percent, based on the total mols of incoming feed.

9. The process of claim 4 wherein the reactants are benzene and propylene and are present in a molar ratio of about 2:1 to about 15:1, the reaction temperature is about 180° to about 260° C. and the pressure about 350 to about 700 pounds per square inch gauge.

10. The process of claim 4 wherein the reactants are benzene and propylene and are present in a molar ratio of about 5:1 to about 10:1, the reaction temperature is about 200° to about 235° C. and the pressure about 400 to about 550 pounds per square inch gauge.

References Cited

UNITED STATES PATENTS

| | | | |
|---|---|---|---|
| 2,403,785 | 7/1946 | Britton et al. | 260—671 R |
| 2,818,452 | 12/1957 | Mavity | 260—671 P |
| 2,995,611 | 8/1961 | Linn et al. | 260—671 R |
| 2,883,438 | 4/1959 | Egbert | 260—671 P |
| 2,920,118 | 4/1960 | Landau et al. | 260—671 P |
| 3,274,278 | 9/1966 | Kapur et al. | 260—671 B |
| 3,385,906 | 5/1968 | Kaufman | 260—671 P |

OTHER REFERENCES

Hougen et al., Chemical Process Principles, Part II, 2nd edition, John Wiley & Sons, New York (1954), pp. 1020-1.

CURTIS R. DAVIS, Primary Examiner

U.S. Cl. X.R.

260—671 P

UNITED STATES PATENT OFFICE
CERTIFICATE OF CORRECTION

PO-1050
(5/69)

Patent No. 3,778,415          Dated December 11, 1973

Inventor(s)   Daniel Y. C. Ko

It is certified that error appears in the above-identified patent and that said Letters Patent are hereby corrected as shown below:

Column 2, line 28, "zeolite" should be "zeolitic".

Column 2, Table I, under Run No. 11, "0.007" should be "0.0073".

Column 4, line 35, "fate" should be "rate".

Column 4, line 72, "70" should be "700".

Signed and sealed this 23rd day of April 1974.

(SEAL)
Attest:

EDWARD M. FLETCHER, JR.
Attesting Officer

C. MARSHALL DANN
Commissioner of Patents